United States Patent [19]

Dönch et al.

[11] Patent Number: 4,851,189
[45] Date of Patent: Jul. 25, 1989

[54] METHOD OF MANUFACTURING CAMS BY POWDER METALLURGY

[75] Inventors: Jurgen Dönch, Bonn; Bernhard Schelb, Königswinter; Wolfgang Zimmermann, Bonn, all of Fed. Rep. of Germany

[73] Assignee: Ringsdorff-Werke GmbH, Bonn, Fed. Rep. of Germany

[21] Appl. No.: 233,244

[22] Filed: Aug. 17, 1988

[30] Foreign Application Priority Data

Aug. 19, 1987 [DE] Fed. Rep. of Germany ....... 3727571

[51] Int. Cl.$^4$ .............................................. B22F 3/24
[52] U.S. Cl. .......................................... 419/28; 419/26; 419/29; 419/58; 419/49; 419/53; 419/54
[58] Field of Search ...................... 419/26, 29, 28, 38, 419/49, 53, 54

[56] References Cited

U.S. PATENT DOCUMENTS

| | | | |
|---|---|---|---|
| 4,251,273 | 2/1981 | Smith et al. | 419/28 |
| 4,373,970 | 2/1983 | Scorey et al. | 419/28 |
| 4,421,717 | 12/1983 | Rao | 419/53 |
| 4,595,556 | 6/1986 | Umeha et al. | 419/54 |

Primary Examiner—Stephen J. Lechert, Jr.
Attorney, Agent, or Firm—Herber L. Lerner; Laurence A. Greenberg

[57] ABSTRACT

Method of manufacturing cams for camsshafts by powder metallurgy, wherein the formed cams have constant properties over the volume thereof and are well polishable, includes molding into a cam blank a powder mixture made up of iron powder alloyed with carbide-forming elements of the fifth and sixth secondary groups of the periodic table, and graphite powder in a quantity necessary for carbide formation; sintering the blank at a temperature of at most 50 K above a solidus temperature of the blank; and compacting the blank by hot-isostatic compression at a temperature below the solidus temperature to at least 99% of a theoretical density.

8 Claims, No Drawings

METHOD OF MANUFACTURING CAMS BY POWDER METALLURGY

The invention relates to a method of manufacturing cams for camshafts by powder metallurgy, wherein the formed cams have constant properties, more particularly a constant modulus of elasticity, over the entire volume of the cams, and can be polished well.

Cams and camshafts used for controlling, for example, valves of internal combustion engines, are conventionally manufactured as a whole or as a unit, particularly from gray cast iron or chilled cast iron; the surface thereof is hardened and ground or polished. It has also been known heretofore to manufacture the cams by powder metallurgy, to slip them onto a steel shaft and to join the cam and shaft to one another. Marked advantages of this heretofore-know production method are the reduction in accelerated masses, the greater rigidity of the steel shaft, and the reduction in grinding work. The costly joining process or joint formation is disadvantageous, however, especially if the connection is formed by brazing or soldering. Although dimensional and material tolerances are not critical in this method, solder or brazing material and soldering or brazing processes are, nevertheless, comparatively expensive. A further disadvantage is the heating of the cams during the soldering or brazing, so that the conventional heat treatment of the cams can be performed only after assembly of the cam and shaft.

Another method of joining cams and the shaft is to shrink-fit the cams on the shaft. Because the torques are transmitted through the seat or location of the pressure-shrink fit, a connection having adequate strength is achieved only if the bore tolerances are very small. The bore tolerance is of lesser importance if the seat is formed by flaring or expanding the usually tubular shaft after the cams have been slipped onto it. In both types of construction, the strength of the seat and hence the transmissible torque are limited by the variation i.e. deviation, of the modulus of elasticity and of the yield strength within the cams produced by powder metallurgy. Variations in the modulus of elasticity and yield strength imply uneven deformations and localized overloads of the cam and can thus cause loosening of the seat.

For materials produced by powder metallurgy, there is a direct relationship between porosity and the properties of the material inclusive of the modulus of elasticity and the yield strength. In powder-metallurgically produced structural parts formed by molding and sintering, the porosity is not distributed uniformly over the entire volume of the structural part. Instead, the pores are concentrated in given regions dictated by the shape of the compressed blank and the flowability of the compression powder. Gradients in the porosity directly determine gradients in the physical properties of the material.

Various methods have become known, heretofore, for reducing the porosity of powder-metallurgically produced bodies, for example, forging or hot-isostatic molding of the sintered blanks. In a first method, a compaction or densification of the bodies is achieved, but the porosity gradients remain largely the same. Only by means of hot-isostatic molding can the porosity of the powder-metallurgically produced structural parts be essentially eliminated. The physical properties of the material are then constant and isotropic over the entire volume of the structural part.

One advantage of cams made by powder metallurgy is the great adaptability of the material. Without major additional expense, it is possible to adapt the composition of the material to the specific stress or load conditions. Compositions are also possible that cannot be attained with casting alloys, because of segregation and grain or crystal growth. With regard to cams which have become known heretofore, this tolerance has been only partly utilized, however. Cams having relatively good wear resistance can be ground or polished only at great expense; on the other hand, cams which are favorably machinable have comparably high wear rates. It is therefore an object of the invention to provide a method of producing cams by powder metallurgy which, while having good wear resistance, can yet be machined well, and which, as a precondition for a durable connection with a shaft, are formed of material having constant properties over the entire cross section thereof, such as a constant modulus of elasticity and a constant yield strength, especially.

With the foregoing and other objects in view, there is provided, in accordance with the invention, a method of manufacturing cams for camshafts by powder metallurgy, wherein the formed cams have constant properties over the volume thereof and are well polishable, which comprises molding into a cam blank a powder mixture made up of iron powder alloyed with carbide-forming elements of the fifth and sixth secondary groups of the periodic table, and graphite powder in a quantity necessary for carbide formation; sintering the blank at a temperature of at most 50K above a solidus temperature of the blank; and compacting the blank by hot-isostatic compression at a temperature below the solidus temperature to at least 99% of a theoretical density.

In accordance with another mode of the inventive method, the iron powder is alloyed and contains from 3 to 5% by weight of chromium, 0.3 to 1.0% by weight of molybdenum, and up to 0.5% by weight of vanadium.

In accordance with a further mode of the method invention, the powder mixture contains from 96.5 to 98.5% by weight of alloyed iron powder, 1.0 to 2.5% by weight of graphite powder and 0.1 to 1.0% by weight of compression aiding material.

In accordance with an added mode, the method of the invention comprises performing the sintering step while avoiding formation of any network made of carbides, and closing accessible pores.

In accordance with an additional mode of the method of the invention, the sintered blank is compacted to the theoretical density.

In accordance with yet another mode of the inventive method, the isostatic compacting of the sintered blank is performed at a temperature of 900° to 1050° C., a pressure of 100 to 500 bar and a residence time of 30 to 90 minutes.

In accordance with yet a further mode of the inventive method, the sintering and the hot-isostatic compression are performed in one and the same furnace.

In accordance with a concomitant mode of the invention, the method includes heat treating the compacted cam blank by hardening and annealing it.

Thus, the alloyed iron powders used for manufacturing the cams contain, as alloying elements, preferably 3 to 5% by weight of chromium, 0.3 to 1.0% by weight of molybdenum, up to 0.5% by weight of vanadium and, if necessary or desirable, even other elements of the fifth or sixth secondary group of the periodic table, in relatively small quantities. The maximum particle size of the commercially available alloys should suitably be less than 0.2 mm. The alloyed iron powder is mixed with graphite powder and a compression aiding material and produces a powder mixture that contains preferably from 96.5 to 98.5% by weight of alloyed iron powder, 1.0 to 2.5% by weight of graphite powder and 0.1 to 1.0% by weight of compression aiding material. Powdered natural graphite, electrographite or graphitic carbon black are suitable for use as the graphite powder, the particle size of which should be less than 0.05, as a maximum, and especially less than 0.02 mm. Commercially available lubricating waxes are advantageously used as the compression aiding material The powders are mixed in drum mixers, double-cone mixers or similar units, and the powder mixture is molded into cams at room temperature in forging or die presses. The compressing pressures are approximately 600 to 800M Pa.

The blanks have a strength that is sufficient for transport and further processing. The porosity is approximately 20% and, as is supported by density measurements and metallographic tests, the pores are not uniformly distributed.

The sintering conditions under which carbides of the alloying elements are precipitated out in the grain or crystal boundaries, yet without the formation of a cohesive network of these carbides which considerably increases the expense or effort of grinding, depends not only on the sintering temperature but also on the sintering time. All of the parameters are rapidly determinable by simple preliminary tests. In no case, however, may the sintering temperature be more than 50K above the solidus temperature. The grinding hardness or resistance to polish of the sintered cams is comparatively low; the porosity amounts to approximately 5% and the pores are essentially closed. The nonuniform distribution of the pores which determines disadvantageous major variations in the modulus of elasticity and elongation at break or rupture remains substantially the same during sintering.

The sintered cams are compacted or densified by hot-isostatic compression to at least 99% of their theoretical density, preferably to the theoretical density. Because the pores of the sintered cams are closed i.e. are no longer in communication with the surface of the cams, a pressure-transmitting sheath or bag is generally unnecessary for the compression process. The compression temperature is lower than the solidus temperature, so that the structure of the material attained after the sintering remains substantially the same. The porosity is virtually exclusively reduced by plastic flowing to a residual porosity of less than 1%. Depending upon the composition of the sintered cams, the compression temperature is preferably 900° to 1050° C.; the compression pressure is 100 to 500 bar and the dwell time is 30 to 90 minutes.

After the hot-isostatic compression, the spectrum of properties of the cams can be adapted to the conditions of use in a conventional manner by hardening and annealing. In particular, the fatigue strength necessary in an individual case because of the high Hertzian stress or compression involved can thus be improved. Hot-isostatic compression and hardening can also be performed in a single operation. Recent furnace constructions also permit the combination of the operational steps of sintering, hot-isostatic compression and hardening.

Cams produced by this method contain no or almost no pores and have an extraordinarily uniform structure. The physical properties, and especially the modulus of elasticity and yield strength, are correspondingly constant.

The variation of the material properties is extraordinarily small, as the following table shows:
Bulk density: 7.8±0.04 g/cm$^3$
Modulus of elasticity: 200±2M Pa
Hardness: 50±1.5 HRC The absolute values depend upon the composition and the heat treatment of the cams.

Connections of cams and shafts produced by shrink-fitting the cams onto the shaft or by flaring or expanding the shaft have excellent strength and enable high torques to be transmitted without loosening the connections. Because the grinding hardness or resistance to polish of the cams is comparatively low, the cams and the shaft can be polished or ground together, in a conventional manner.

The invention is described by way of an example:

EXAMPLE

Cams were molded from a powder mixture containing 97.3% of commercially available alloyed iron powder having 3% chromium, 0.35% manganese, 0.40% molybdenum, 0.25% vanadium, together with 2.5% graphite and 0.3% amide wax as a lubricant. The maximum grain or particle size of the alloyed iron powder was 200 $\mu$m; the grain or particle size of the graphite powder was 15 $\mu$m. Mixing was performed for 10 minutes in a double-cone mixer. Cams having a porosity of 22% were molded in a die press at a pressure of 600M Pa. The cams had the following dimensions: long axis 50 mm, short axis 40 mm, height 25 mm, bore diameter 30 mm.

The cams were sintered in a vacuum:
Temperature: 1050K
Dwell time 30 min
Pressure: <1 mbar The sintered cams which had a porosity of approximately 5% were hot-isostatically compacted or densified. The conditions were as follows:
Heating to 1000° C. in one hour, during which pressure was increased to 500 bar.
Holding time 1 hour.
Cooling from 100° C. to room temperature in one hour.
Protective gas: argon.

The cams were pore-free. Carbides having a mean size of 3 $\mu$m and a maximum size of 10 $\mu$m were uniformly dispersed in the metallic matrix. There were no strip-like or network-like structures. By means of a heat treatment, a hardness of 55±1 HRC was established. The cams were able to be ground or polished excellently, and the ground or polished surface was smooth and without pitting.

The foregoing is a description corresponding in substance to German application No. P 37 27 571.2, dated Aug. 19, 1987, the International priority of which is being claimed for the instant application, and which is hereby made part of this application. Any material discrepancies between the foregoing specification and the aforementioned corresponding German application are to be resolved in favor of the latter.

We claim:

1. Method of manufacturing cams for camshafts by powder metallurgy, wherein the formed cams have constant properties over the volume thereof and are well polishable, which comprises
   (a) molding into a cam blank a powder mixture made up of iron powder alloyed with carbide-forming elements of the fifth and sixth secondary groups of the periodic table, and graphite powder in a quantity necessary for carbide formation;
   (b) sintering the blank at a temperature of at most 50 K above a solidus temperature of the blank; and
   (c) compacting the blank by hot-isostatic compression at a temperature below the solidus temperature to at least 99% of a theoretical density.

2. Method according to claim 1, wherein the iron powder is alloyed and contains from 3 to 5% by weight of chromium, 0.3 to 1.0% by weight of molybdenum, and up to 0.5% by weight of vanadium.

3. Method according to claim 1, wherein the powder mixture contains from 96.5 to 98.5% by weight of alloyed iron powder, 1.0 to 2.5% by weight of graphite powder and 0.1 to 1.0% by weight of compression aiding material.

4. Method according to claim 1, which comprises performing the sintering step while avoiding formation of any network made of carbides, and closing accessible pores.

5. Method according to claim 1, wherein the sintered blank is compacted to the theoretical density.

6. Method according to claim 1, wherein the isostatic compacting of the sintered blank is performed at a temperature of 900° to 1050° C., a pressure of 100 to 500 bar and a residence time of 30 to 90 minutes.

7. Method according to claim 1, wherein the sintering and the hot-isostatic compression are performed in one and the same furnace.

8. Method according to claim 1, which includes heat treating the compacted cam blank by hardening and annealing it.

* * * * *